US012095210B2

(12) United States Patent
Lin

(10) Patent No.: US 12,095,210 B2
(45) Date of Patent: Sep. 17, 2024

(54) ADAPTER CIRCUIT BOARD, FIRST CONNECTOR AND CONNECTOR ASSEMBLY WITH BETTER SIGNAL INTEGRITY

(71) Applicant: DONGGUAN LUXSHARE TECHNOLOGIES CO., LTD, Dongguan (CN)

(72) Inventor: Yanbo Lin, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 330 days.

(21) Appl. No.: 17/581,236

(22) Filed: Jan. 21, 2022

(65) Prior Publication Data

US 2022/0294168 A1 Sep. 15, 2022

(30) Foreign Application Priority Data

Mar. 10, 2021 (CN) ......................... 202110257826.6

(51) Int. Cl.

*H01R 31/06* (2006.01)
*H01R 12/70* (2011.01)
*H01R 13/02* (2006.01)
*H01R 24/66* (2011.01)
*H01R 24/76* (2011.01)

(52) U.S. Cl.

CPC ............. *H01R 31/06* (2013.01); *H01R 12/70* (2013.01); *H01R 13/02* (2013.01); *H01R 24/66* (2013.01); *H01R 24/76* (2013.01)

(58) Field of Classification Search

CPC ........ H01R 31/06; H01R 12/70; H01R 13/02; H01R 24/66; H01R 24/76; H01R 12/71; H01R 12/72; H01R 12/73; H01R 12/75; H01R 12/721; H01R 12/737; H05K 1/117

See application file for complete search history.

(56) References Cited

U.S. PATENT DOCUMENTS 4,885,482 A * 12/1989 Sharp ..................... H05K 1/117 326/82
6,017,248 A * 1/2000 Pan .................... H01R 12/7005 439/681

(Continued)

FOREIGN PATENT DOCUMENTS

CN 201336488 Y 10/2009
CN 102801069 A 11/2012

(Continued)

*Primary Examiner* — Thanh Tam T Le

(74) *Attorney, Agent, or Firm* — Birch, Stewart, Kolasch & Birch, LLP

(57) ABSTRACT

An adapter circuit board includes an input end and an output end. The input end includes an input portion for connecting with a first connector header. The output end includes an output portion and an insertion portion for being inserted into a second connector. The output portion is used for directly or indirectly electrically connecting with cables to transmit high-speed signals. This setting improves the signal integrity of high-speed signals during transmission and therefore improves the quality of data transmission. In addition, the present disclosure also relates to a first connector and a connector assembly having the adapter circuit board.

20 Claims, 12 Drawing Sheets

(56) References Cited

U.S. PATENT DOCUMENTS

| | | | | |
|---|---|---|---|---|
| 6,466,452 | B2 * | 10/2002 | Yamada | H01R 12/707<br>361/801 |
| 6,663,401 | B2 * | 12/2003 | Billman | H01R 13/631<br>439/701 |
| 8,423,695 | B2 * | 4/2013 | Purwin | H05K 1/117<br>710/301 |
| 8,432,708 | B2 * | 4/2013 | Chen | G06F 1/26<br>710/316 |
| 8,514,584 | B2 * | 8/2013 | Liang | G06F 1/185<br>361/728 |
| 8,854,833 | B2 * | 10/2014 | Chen | G06F 1/185<br>361/784 |
| 8,913,388 | B2 * | 12/2014 | Teo | F28F 3/02<br>361/713 |
| 8,942,057 | B1 * | 1/2015 | Xiao | G11C 5/143<br>365/228 |
| 10,020,603 | B1 * | 7/2018 | Liu | H01R 12/737 |
| 10,249,970 | B1 * | 4/2019 | Lin | H01R 12/7076 |
| 11,031,708 | B2 * | 6/2021 | Teh | H01R 12/721 |

FOREIGN PATENT DOCUMENTS

| | | | |
|---|---|---|---|
| CN | 110504575 | A | 11/2019 |
| CN | 212571588 | U | 2/2021 |
| CN | 114447680 | A | 5/2022 |
| TW | 532665 | U | 5/2003 |
| TW | M337879 | U | 8/2008 |

* cited by examiner

ADAPTER CIRCUIT BOARD, FIRST CONNECTOR AND CONNECTOR ASSEMBLY WITH BETTER SIGNAL INTEGRITY

CROSS-REFERENCE TO RELATED APPLICATION

This patent application claims priority of a Chinese Patent Application No. 202110257826.6, filed on Mar. 10, 2021 and titled "ADAPTER CIRCUIT BOARD, FIRST CONNECTOR AND CONNECTOR ASSEMBLY", the entire content of which is incorporated herein by reference.

TECHNICAL FIELD

The present disclosure relates to an adapter circuit board, a first connector and a connector assembly, which belongs to a technical field of connectors.

BACKGROUND

According to the requirements of layout and communication, in the prior art, the electrical connection between an electronic card and a main circuit board is realized by providing a connector assembly. In general, the connector assembly includes a first connector and a second connector which cooperate with each other. The first connector is adapted for receiving the electronic card. The second connector is adapted for being mounted to the main circuit board.

With the continuous improvement of requirements of electronic equipment for data transmission, it also puts forward higher requirements for connector assemblies. Therefore, the first connector may also include an adapter circuit board. An input end of the adapter circuit board is electrically connected with the electronic card. An output end of the adapter circuit board is electrically connected with the second connector. However, in the pursuit of high-speed and/or high-frequency data transmission, considering the loss of high-speed signal transmission in the adapter circuit board, it is difficult to ensure signal integrity for high-speed signal pairs if the adapter circuit board is adapted to communicate with the second connector, thereby reducing the quality of data transmission.

SUMMARY

An object of the present disclosure is to provide an adapter circuit board, a first connector, and a connector assembly which can maintain better signal integrity.

In order to achieve the above object, the present disclosure adopts the following technical solution: an adapter circuit board, including: an input end, the input end including an input portion for connecting with a first connector header; and an output end, the output end including an insertion portion for being inserted into a second connector; wherein the output end further includes an output portion, and the output portion is adapted for directly or indirectly electrically connecting with cables so as to transmit high-speed signals.

In order to achieve the above object, the present disclosure adopts the following technical solution: a first connector, including: a first connector header; and an adapter circuit board, the adapter circuit board including: an input end, the input end including an input portion for connecting with a first connector header; and an output end, the output end including an insertion portion for being inserted into a second connector; wherein the output end further includes an output portion, and the output portion is adapted for directly or indirectly electrically connecting with cables so as to transmit high-speed signals; the first connector header including: a first insulating body, the first insulating body including a first mating surface and a first mating slot extending through the first mating surface; and a plurality of first conductive terminals, each first conductive terminal including a first tail portion electrically connected to the input portion and a first mating portion extending into the first mating slot.

In order to achieve the above object, the present disclosure adopts the following technical solution: a connector assembly, including: a first connector and a second connector which are matched with each other, the first connector including: a first connector header, the first connector header including a first insulating body and a plurality of first conductive terminals, the first insulating body including a first mating surface and a first mating slot extending through the first mating surface, each first conductive terminal including a first tail portion electrically connected to the input portion and a first mating portion extending into the first mating slot; and an adapter circuit board, the adapter circuit board including: an input end, the input end including an input portion for connecting with a first connector header; and an output end, the output end including an insertion portion for being inserted into a second connector; wherein the output end further includes an output portion, and the output portion is adapted for directly or indirectly electrically connecting with cables so as to transmit high-speed signals; the second connector including: a second insulating body, the second insulating body including a second mating surface and a second mating slot extending through the second mating surface; and a plurality of second conductive terminals, the second conductive terminals being fixed to the second insulating body and extending into the second mating slot; wherein the insertion portion of the adapter circuit board is adapted to be inserted into the second mating slot, so that the insertion portion and the second conductive terminals are electrically connected.

Compared with the prior art, the present disclosure provides an output portion on the output end of the adapter circuit board, and the output portion is adapted to directly or indirectly electrically connect to the cables so as to transmit high-speed signals. As a result, the signal integrity of high-speed signals during transmission is improved, thereby improving the quality of data transmission.

DETAILED DESCRIPTION

Figure 1:
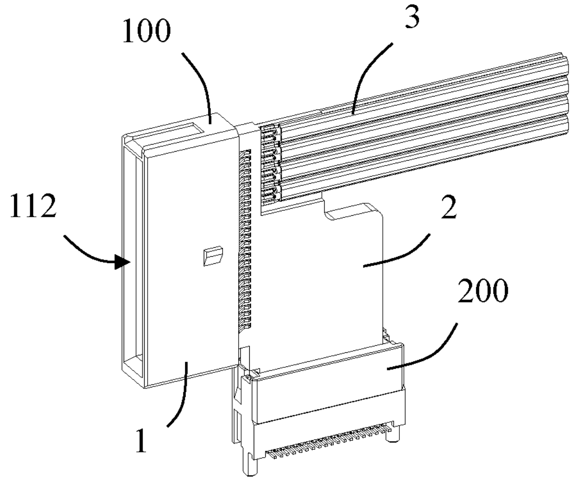
FIG. 1 is a perspective schematic view of an electrical connector assembly in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
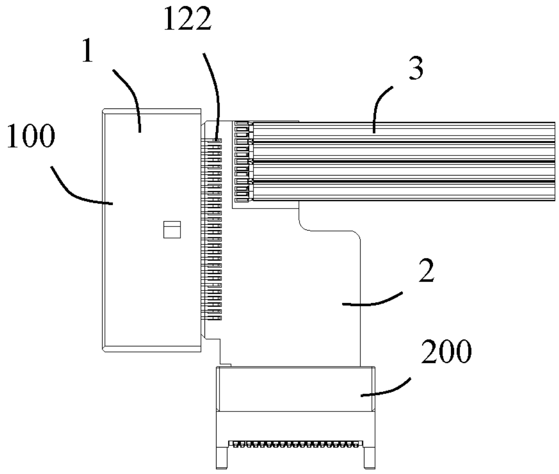
FIG. 2 is a right side view of FIG. 1.
Figure 3:
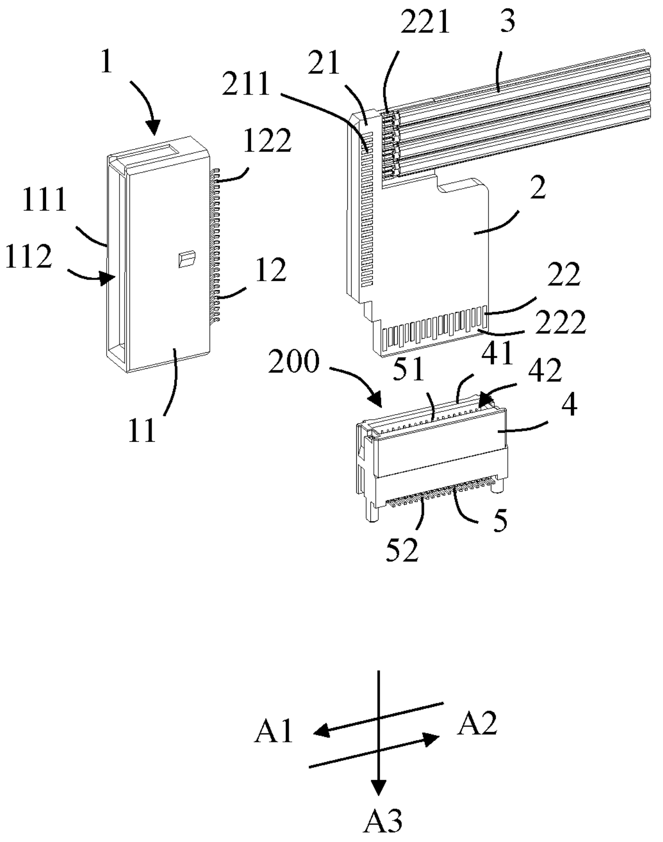
FIG. 3 is a partially exploded perspective view of FIG. 1.

Referring to FIGS. 1 to 3, illustrated embodiments of the present disclosure disclose a connector assembly including a first connector 100 and a second connector 200 which are mated with each other. In the illustrated embodiments of the present disclosure, the first connector 100 is adapted to receive an electronic card (not shown). The second connector 200 is adapted for being mounted to a circuit board (not shown).

The first connector 100 includes a first connector header 1, an adapter circuit board 2 electrically connected to the first connector header 1, and cables 3 directly or indirectly electrically connected to the adapter circuit board 2 so as to transmit high-speed signals.

The first connector header 1 includes a first insulating body 11 and a plurality of first conductive terminals 12 fixed to the first insulating body 11. The first insulating body 11 includes a first mating surface 111 and a first mating slot 112 extending through the first mating surface 111 along a first direction A1. Referring to FIG. 3, in the illustrated embodiment of the present disclosure, the first direction A1 is a direction from right to left.

In the illustrated embodiment of the present disclosure, the first conductive terminals 12 are disposed in two rows. Each first conductive terminal 12 includes a first mating portion extending into the first mating slot 112 and a first tail portion 122 for electrically connecting with the adapter circuit board 2. The first mating slot 112 is adapted for receiving the electronic card. The electronic card is provided with a plurality of golden fingers. The first mating portions are in contact with the golden fingers. In an embodiment of the present disclosure, the gold fingers of the electronic card are in two rows and are located on opposite surfaces of the electronic card, respectively. By providing two rows of first conductive terminals 12, the two rows of first conductive terminals 12 can provide a certain force to clamp the electronic card, so that the electronic card can be better held in the first mating slot 112, and the risk of loosening of the electronic card is reduced. In the illustrated embodiment of the present disclosure, the first tail portions 122 extend beyond the first insulating body 11 in a direction away from the first direction A1, so as to achieve electrical connection with the adapter circuit board 2. For example, the first tail portions 122 are fixed to the adapter circuit board 2 by soldering.

Of course, in other embodiments, the first conductive terminals 12 may also be arranged in a row. Correspondingly, the electronic card is provided with a row of golden fingers. The first tail portions 122 may not extend beyond the first insulating body 11. For example, the adapter circuit board 2 is inserted into the first insulating body 11 to contact the first tail portions 122.

The second connector 200 includes a second insulating body 4 and a plurality of second conductive terminals 5 fixed to the second insulating body 4. The second insulating body 4 includes a second mating surface 41 and a second mating slot 42 extending through the second mating surface 41. The second mating slot 42 is adapted for receiving the adapter circuit board 2. Each second conductive terminal 5 includes a second mating portion 51 extending into the second mating slot 42 and a second tail portion 52 for fixing to the circuit board. In an embodiment of the present disclosure, the second conductive terminals 5 are disposed in two rows, and the two rows of the second conductive terminals 5 can provide a certain force to clamp the adapter circuit board 2 so that the adapter circuit board 2 is better held in the second mating slot 42 to reduce the risk of loosening the adapter circuit board 2.

Figure 4:
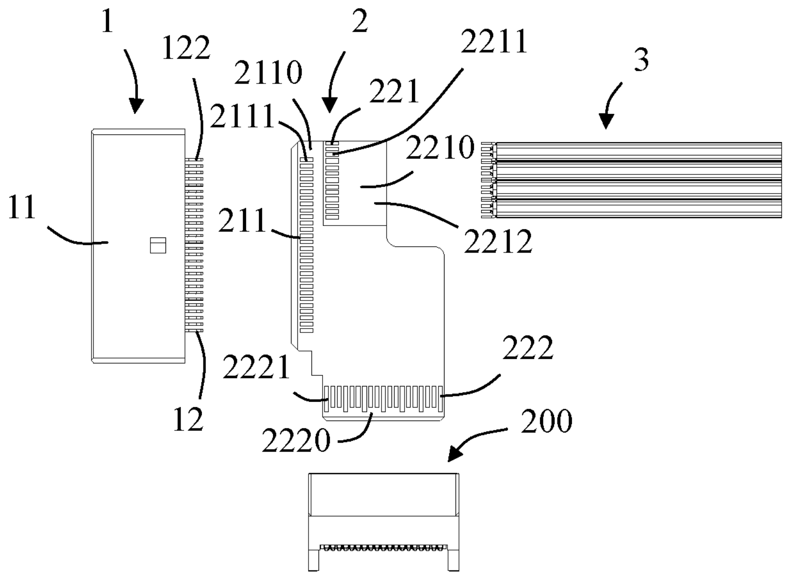
FIG. 4 is a right side view of FIG. 3.
Figure 5:
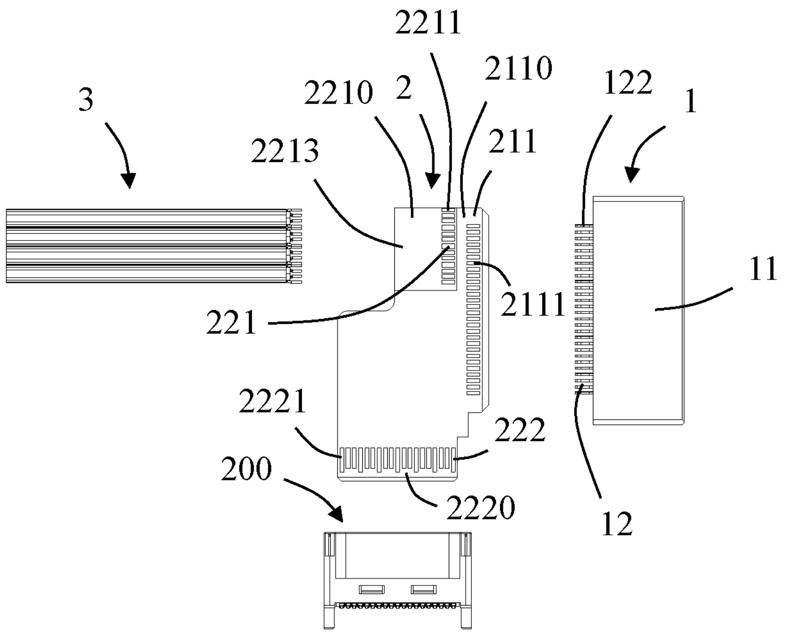
FIG. 5 is a left side view of FIG. 3.

Specifically, referring to FIGS. 3 to 5, in an embodiment of the present disclosure, the adapter circuit board 2 includes an input end 21 and an output end 22. The input end 21 includes an input portion 211 for connecting with the first connector header 1. The output end 22 includes an output portion 221 and an insertion portion 222 for being inserted into the second connector 200. The output portion 221 is adapted to directly or indirectly electrically connect with the cables 3 to transmit high-speed signals.

The input portion 211 extends along the first direction A1 and is located on a left side of the adapter circuit board 2. The insertion portion 222 extends along a second direction A2 perpendicular to the first direction A1 and is located at a bottom of the adapter circuit board 2. In an embodiment of the present disclosure, the output portion 221 is located on a right side of the input portion 211 and on top of the insertion portion 222.

The input portion 211 includes a plurality of first conductive pads 2111 for electrically connecting with the first connector header 1. In the illustrated embodiment of the present disclosure, the input portion 211 includes two first side surfaces 2110 disposed oppositely. The first conductive pads 2111 are provided on the two first side surfaces 2110. Each first conductive pad 2111 extends along the first direction A1. The first conductive pads 2111 on each side are spaced up and down along a direction parallel to the second direction A2.

The insertion portion 222 includes a plurality of second conductive pads 2221 for electrically connecting with the second connector 200. The insertion portion 222 includes two second side surfaces 2220 disposed oppositely. The second conductive pads 2221 are provided on the two second side surfaces 2220. Each second conductive pad 2221 extends along the second direction A2. The second conductive pads 2221 on each side are arranged at left and right intervals along a direction parallel to the first direction A1.

The output portion 221 includes a plurality of third conductive pads 2211. The output portion 221 includes two third side surfaces 2210 opposite to each other, and the third conductive pads 2211 are provided on the two third side surfaces 2210. Referring to FIGS. 3 to 5, in an embodiment of the present disclosure, each third conductive pad 2211 extends along the third direction A3. The third direction A3 is parallel to the first direction A1. The third conductive pads 2211 on each side are spaced up and down along a direction parallel to the second direction A2. The third conductive pads 2211 are fixedly connected to the cables 3. For example, the third conductive pads 2211 and the cables 3 are fixed by soldering. Of course, in other embodiments, the third conductive pads 2211 and the cables 3 may also be fixed by dispensing glue.

The output portion 221 includes a first recessed portion 2212 and a second recessed portion 2213 disposed oppositely. Parts of the third conductive pads 2211 (for example, the third conductive pads 2211 on one side) are located in the first recessed portion 2212. Remaining parts of the third conductive pads 2211 (for example, the third conductive pad 2211 on the other side) are located in the second recessed portion 2213. By arranging the first recessed portion 2212 and the second recessed portion 2213, the thickness of the adapter circuit board 2 can be fully utilized to reduce the fixed connection between the cables 3 and the third conductive pads 2211. The cables 3 protrude outwardly by a distance of the third side surface 2210. Of course, in some embodiments, when the thickness of the adapter circuit board 2 is sufficient, the cables 3 may not even protrude from the third side surface 2210 to the outside. In addition, by providing the first recessed portion 2212 and the second recessed portion 2213, it is also possible to provide fixture positioning when the cables 3 is soldered to the third conductive pads 2211, thereby helping to improve the soldering efficiency.

Figure 6:
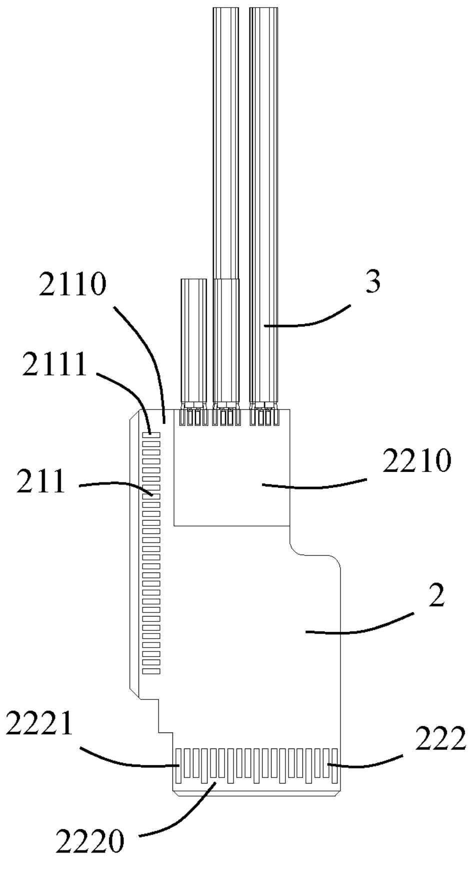
FIG. 6 is a schematic view of an adapter circuit board in accordance with a second embodiment of the present disclosure when it is connected to cables.
Figure 7:
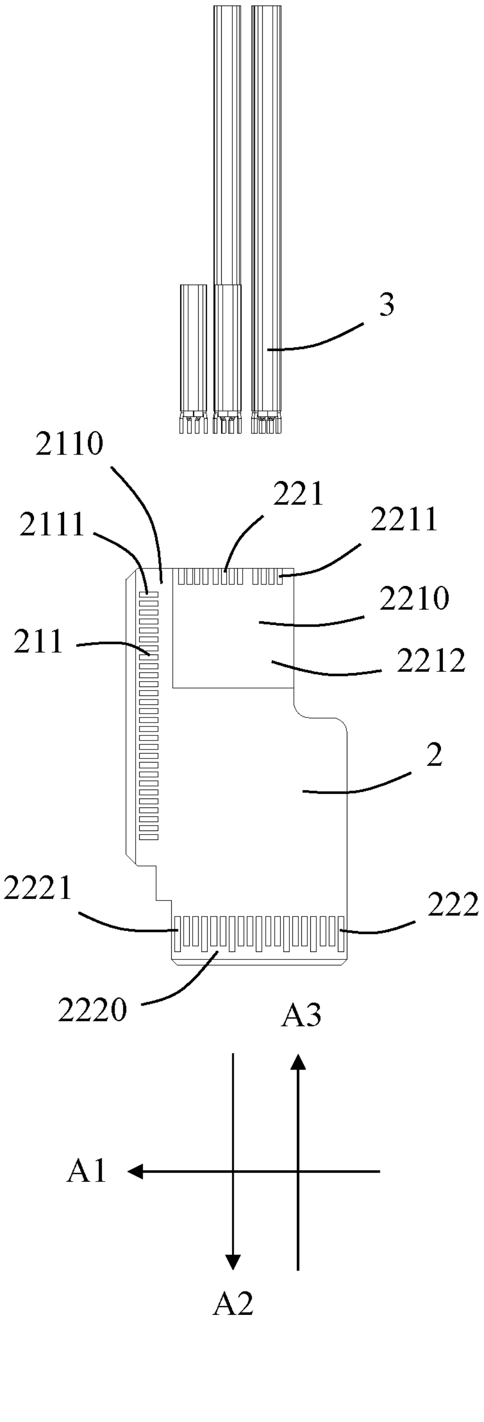
FIG. 7 is an exploded view of FIG. 6.
Figure 8:
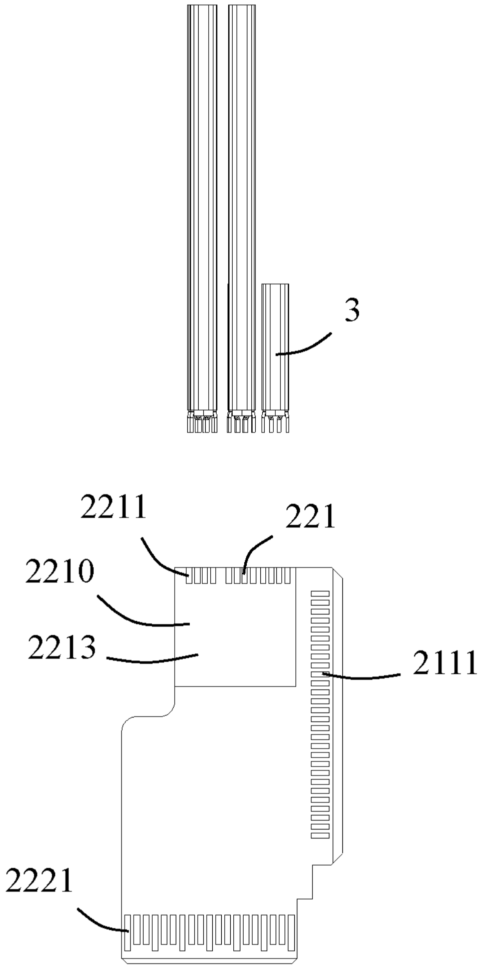
FIG. 8 is an exploded view of FIG. 7 from another angle.
Figure 9:
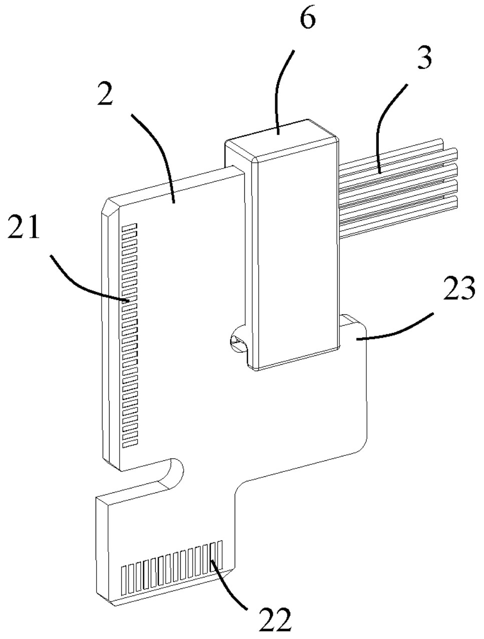
FIG. 9 is a schematic view of the adapter circuit board when it is connected to the cables in accordance with a third embodiment of the present disclosure.
Figure 10:
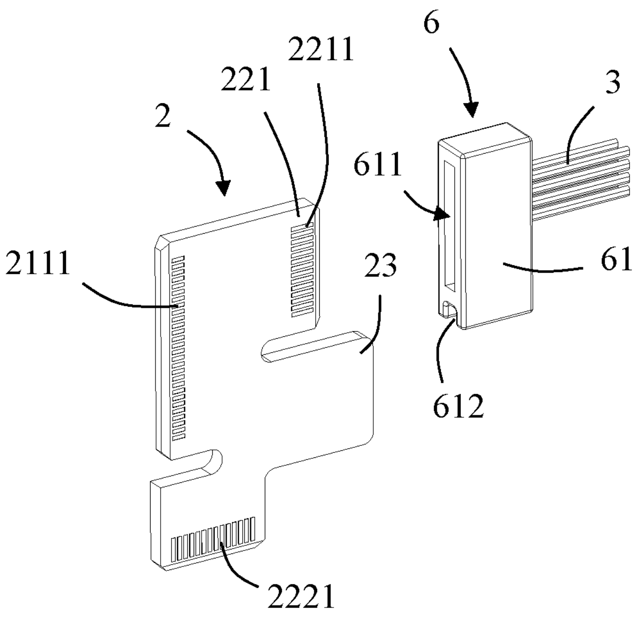
FIG. 10 is an exploded perspective view of FIG. 9.
Figure 11:
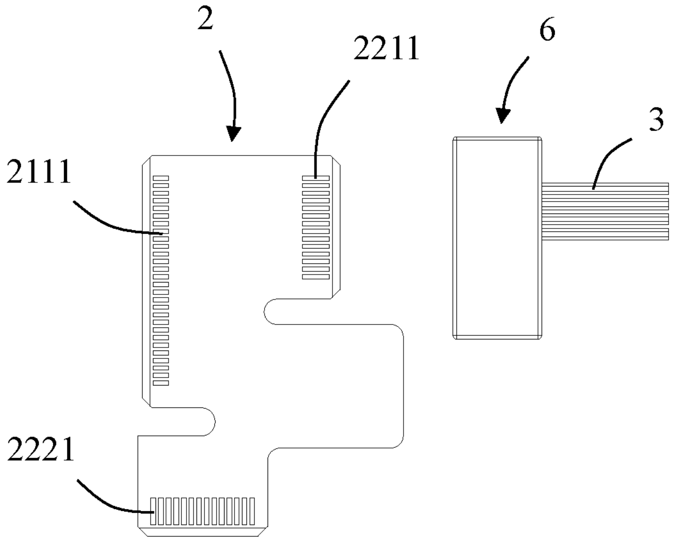
FIG. 11 is a right side view of FIG. 10.
Figure 12:
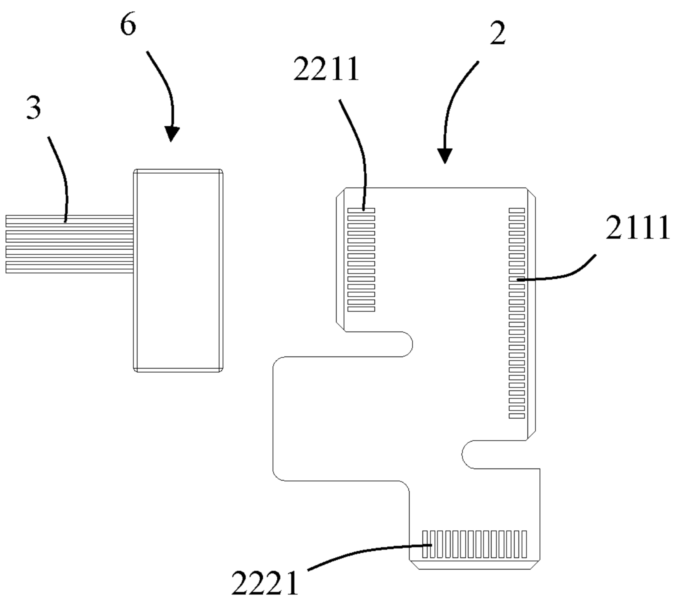
FIG. 12 is a left side view of FIG. 10.

Referring to FIGS. 6 to 8, in another embodiment of the adapter circuit board 2 of the present disclosure, the output portion 221 is located on top of the adapter circuit board 2. The third conductive pads 2211 extend along the third direction A3. The third direction A3 is perpendicular to the first direction A1. The third conductive pads 2211 on each side are arranged at left and right intervals along a direction parallel to the first direction A1. The third conductive pads 2211 are fixedly connected to the cables 3. For example, the third conductive pads 2211 and the cables 3 are fixed by soldering. Of course, in other embodiments, the third conductive pads 2211 and the cables 3 may also be fixed by dispensing glue.

The output portion 221 includes a first recessed portion 2212 and a second recessed portion 2213 disposed oppositely. Parts of the third conductive pads 2211 (for example, the third conductive pad 2211 on one side) are located in the first recessed portion 2212. Remaining parts of the third conductive pads 2211 (for example, the third conductive pad 2211 on the other side) are located in the second recessed portion 2213. By arranging the first recessed portion 2212 and the second recessed portion 2213, the thickness of the adapter circuit board 2 can be fully utilized to reduce the fixed connection between the cables 3 and the third conductive pads 2211. The cables 3 protrude outwardly by a distance of the third side surface 2210. Of course, in some embodiments, when the thickness of the adapter circuit board 2 is sufficient, the cables 3 may not even protrude from the third side surface 2210 to the outside. In addition, by providing the first recessed portion 2212 and the second recessed portion 2213, it is also possible to provide fixture positioning when the cables 3 are soldered to the third conductive pads 2211, thereby helping to improve the soldering efficiency.

Referring to FIGS. 9 to 12, in another embodiment of the adapter circuit board 2 of the present disclosure, the output portion 221 is adapted for being inserted into an adapter connector 6. The output portion 221 extends in a direction opposite to the first direction A1 and is located on a right side of the adapter circuit board 2. The output portion 221 includes a plurality of third conductive pads 2211. The output portion 221 includes two third side surfaces 2210 arranged opposite to each other. The third conductive pads 2211 are provided on the two third side surfaces 2210.

The adapter connector 6 includes a third insulating body 61, a plurality of third conductive terminals (not shown) fixed to the third insulating body 61, and the cables 3. The third conductive pads 2211 are adapted for connecting with one end of the third conductive terminals. The cables 3 are adapted to be fixedly connected to the other end of the third conductive terminals. For example, the third conductive terminals and the cables 3 are fixed by soldering, riveting or dispensing. The third insulating body 61 includes a third mating slot 611 for receiving the output portion 221 and a positioning groove 612 located below the third mating slot 611. The adapter circuit board 2 is provided with a positioning tab 23 that matches with the positioning groove 612. After the output portion 221 is inserted into the third mating slot 611, the third conductive terminals abut against the third conductive pads 2211, so as to realize the electrical connection between the third conductive pads 2211 and the cables 3.

In an embodiment of the present disclosure, the number of the first conductive pads 2111 is equal to the sum of the number of the second conductive pads 2221 and the number of the third conductive pads 2211. Some signals (such as non-high-speed signals) of the signals input from the input portion 211 communicate with the main circuit board through the electrical connection between the plug portion 222 and the second connector 200; Some other signals (such as high-speed signals) communicate with the cables 3 through the third conductive pads 2211 on the output portion 221. Compared with the prior art, by arranging the cables 3 to transmit the high-speed signals, the signal integrity of the high-speed signals during transmission is improved, thereby improving the quality of data transmission. In addition, this design of the adapter circuit board 2 of the present disclosure is also beneficial to simplify the arrangement of the second conductive pads 2221 and the third conductive pads 2211 on the adapter circuit board 2. By arranging the second conductive pads 2221 and the third conductive pads 2211 at different positions on the adapter circuit board 2, the arrangement of the second conductive pads 2221 and the third conductive pads 2211 is reduced, thereby it is beneficial to realize the miniaturization of the adapter circuit board 2.

The above embodiments are only used to illustrate the present disclosure and not to limit the technical solutions described in the present disclosure. The understanding of this specification should be based on those skilled in the art. Descriptions of directions, such as “front”, “back”, “left”, “right”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An adapter circuit board, comprising:

an input end, the input end comprising an input portion for connecting with a first connector header; the input portion being located on a first edge of the adapter circuit board; the input portion comprising a plurality of first conductive pads configured to be fixed to a plurality of first tail portions of the first connector header, respectively; and an output end, the output end comprising an insertion portion for being inserted into a second connector; the insertion portion being located on a second edge of the adapter circuit board; the second edge being perpendicular to the first edge; the insertion portion comprising a plurality of second conductive pads configured to be in contact with a plurality of second mating portions of the second connector, respectively;

wherein the output end further comprises an output portion, the output portion comprises a plurality of third conductive pads which are adapted for directly or indirectly electrically connecting with cables;

wherein the input end is configured to mate with the first connector header to receive input signals; the input signals are processed by the adapter circuit board to be output signals; part of the output signals are non-high-speed signals and a remaining part of the output signals are high-speed signals; the insertion portion of the output end is configured to mate with the second connector to output the non-high-speed signals; and the plurality of third conductive pads of the output end are configured to mate with the cables to output the high-speed signals.

2. The adapter circuit board according to claim 1, wherein the input portion comprises two first side surfaces disposed oppositely, and the first conductive pads are provided on the two first side surfaces; and wherein the insertion portion comprises two second side surfaces disposed oppositely, and the second conductive pads are provided on the two second side surfaces.

3. The adapter circuit board according to claim 1, wherein each first conductive pad extends along a first direction, and each second conductive pad extends along a second direction which is perpendicular to the first direction.

4. The adapter circuit board according to claim 3, wherein the plurality of third conductive pads are fixedly connected to the cables.

5. The adapter circuit board according to claim 4, wherein the output portion comprises two third side surfaces arranged oppositely, and the third conductive pads are provided on the two third side surfaces.

6. The adapter circuit board according to claim 5, wherein the output portion comprises a first recessed portion and a second recessed portion disposed oppositely, parts of the third conductive pads are located in the first recessed portion, and remaining parts of the third conductive pads are located in the second recessed portion.

7. The adapter circuit board according to claim 4, wherein each third conductive pad extends along a third direction which is parallel or perpendicular to the first direction.

8. The adapter circuit board according to claim 3, wherein the output portion is adapted for being inserted into an adapter connector; wherein the adapter connector comprises a third insulating body, a plurality of third conductive terminals fixed to the third insulating body, and the cables; and wherein the third conductive pads are adapted for being connecting with one end of the third conductive terminals, and the cables are adapted for fixedly connecting with the other end of the third conductive terminals.

9. The adapter circuit board according to claim 1, wherein the first connector header comprises a first insulating body and a plurality of first conductive terminals fixed to the first insulating body; the first insulating body comprises a first mating surface and a first mating slot extending through the first mating surface; each first tail portion is provided on a corresponding first conductive terminal; each first conductive terminal further comprises a first mating portion extending into the first mating slot; the first mating slot is configured to receive an electronic card which is electrically connected to the first mating portions of the plurality of first conductive terminals.

10. A first connector, comprising:

a first connector header; and an adapter circuit board, the adapter circuit board comprising:

an input end, the input end comprising an input portion for connecting with the first connector header; the input portion being located on a first edge of the adapter circuit board; the input portion comprising a plurality of first conductive pads; and an output end, the output end comprising an insertion portion for being inserted into a second connector; the insertion portion being located on a second edge of the adapter circuit board; the second edge being perpendicular to the first edge; the insertion portion comprising a plurality of second conductive pads;

wherein the output end further comprises an output portion, the output portion comprises a plurality of third conductive pads which are adapted for directly or indirectly electrically connecting with cables;

the first connector header comprising:

a first insulating body, the first insulating body comprising a first mating surface and a first mating slot extending through the first mating surface; the first mating slot being configured to receive an electronic card; and a plurality of first conductive terminals, each first conductive terminal comprising a first tail portion electrically connected to a corresponding first conductive pad of the input portion and a first mating portion extending into the first mating slot to be electrically connected to the electronic card;

wherein the input end is configured to mate with the first connector header to receive input signals; the input signals are processed by the adapter circuit board to be output signals; part of the output signals are non-high-speed signals and a remaining part of the output signals are high-speed signals; the insertion portion of the output end is configured to mate with the second connector to output the non-high-speed signals; and the plurality of third conductive pads of the output end are configured to mate with the cables to output the high-speed signals.

11. The first connector according to claim 10, wherein the input portion comprises two first side surfaces disposed oppositely, and the first conductive pads are provided on the two first side surfaces; and wherein the insertion portion comprises two second side surfaces disposed oppositely, and the second conductive pads are provided on the two second side surfaces.

12. The first connector according to claim 10, wherein each first conductive pad extends along a first direction, and each second conductive pad extends along a second direction which is perpendicular to the first direction; wherein the plurality of third conductive pads are fixedly connected to the cables.

13. The first connector according to claim 12, wherein the output portion comprises two third side surfaces arranged oppositely, and the third conductive pads are provided on the two third side surfaces; wherein the output portion comprises a first recessed portion and a second recessed portion disposed oppositely, parts of the third conductive pads are located in the first recessed portion, and remaining parts of the third conductive pads are located in the second recessed portion.

14. The first connector according to claim 12, wherein each third conductive pad extends along a third direction which is parallel or perpendicular to the first direction; wherein the output portion is adapted for being inserted into an adapter connector; wherein the adapter connector comprises a third insulating body, a plurality of third conductive terminals fixed to the third insulating body, and the cables; and wherein the third conductive pads are adapted for being connecting with one end of the third conductive terminals, and the cables are adapted for fixedly connecting with the other end of the third conductive terminals.

15. The first connector according to claim 12, wherein each first tail portion extends beyond the first insulating body along a direction away from the first mating surface; each first tail portion is fixedly connected to the corresponding first conductive pad of the input portion.

16. A connector assembly, comprising: a first connector and a second connector which are matched with each other, the first connector comprising:

a first connector header, the first connector header comprising a first insulating body and a plurality of first conductive terminals, the first insulating body comprising a first mating surface and a first mating slot extending through the first mating surface, each first conductive terminal comprising a first tail portion electrically connected to the input portion and a first mating portion extending into the first mating slot; and an adapter circuit board, the adapter circuit board comprising:

an input end, the input end comprising an input portion for connecting with the first connector header; the input portion comprising a plurality of first conductive pads for electrically connecting with the first connector header; and an output end, the output end comprising an insertion portion for being inserted into the second connector; the insertion portion comprising a plurality of second conductive pads for electrically connecting with the second connector;

wherein the output end further comprises an output portion, the output portion comprises a plurality of third conductive pads which are adapted for directly or indirectly electrically connecting with cables so as to transmit high-speed signals;

wherein the output portion comprises two third side surfaces which are respectively located on two opposite sides of the output portion, a first recessed portion recessed along a thickness direction of the output portion, and a second recessed portion recessed along the thickness direction of the output portion and disposed opposite to the first recessed portion; the third conductive pads are provided on the two third side surfaces; parts of the third conductive pads are located in the first recessed portion, and remaining parts of the third conductive pads are located in the second recessed portion; among the cables, those cables connected to the third conductive pads, which are located in the second recessed portion, are at least partially received in the second recessed portion;

the second connector comprising:

a second insulating body, the second insulating body comprising a second mating surface and a second mating slot extending through the second mating surface; and a plurality of second conductive terminals, the second conductive terminals being fixed to the second insulating body and extending into the second mating slot;

wherein the insertion portion of the adapter circuit board is adapted to be inserted into the second mating slot, so that the insertion portion and the second conductive terminals are electrically connected.

17. The connector assembly according to claim 16, wherein the input portion comprises a plurality of first conductive pads for electrically connecting with the first connector header, and the insertion portion comprises a plurality of second conductive pads for electrically connecting with the second connector.

18. The connector assembly according to claim 17, wherein the input portion comprises two first side surfaces disposed oppositely, and the first conductive pads are provided on the two first side surfaces; and wherein the insertion portion comprises two second side surfaces disposed oppositely, and the second conductive pads are provided on the two second side surfaces.

19. The connector assembly according to claim 16, wherein each first conductive pad extends along a first direction, and each second conductive pad extends along a second direction which is perpendicular to the first direction; wherein the plurality of third conductive pads are fixedly connected to the cables.

20. The connector assembly according to claim 16, wherein the input end is configured to mate with the first connector header to receive input signals; the input signals are processed by the adapter circuit board to be output signals; part of the output signals are non-high-speed signals and a remaining part of the output signals are the high-speed signals; the insertion portion of the output end is configured to mate with the second connector to output the non-high-speed signals; and the output portion of the output end is configured to mate with the cables to output the high-speed signals.

* * * * *